United States Patent
Feng et al.

(10) Patent No.: US 9,934,144 B2
(45) Date of Patent: Apr. 3, 2018

(54) CACHE ALLOCATION FOR DISK ARRAY

(71) Applicant: International Business Machines Corporation, Armonk, NY (US)

(72) Inventors: Zhengyuan Feng, Shanghai (CN); Xue Dong Gao, Shanghai (CN); Changping Lu, Shanghai (CN); Ming Zhi Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 14/857,856

(22) Filed: Sep. 18, 2015

(65) Prior Publication Data

US 2016/0124673 A1    May 5, 2016

(30) Foreign Application Priority Data

Oct. 31, 2014  (CN) .......................... 2014 1 0602434

(51) Int. Cl.
*G06F 12/0802* (2016.01)
*G06F 12/02* (2006.01)
*G06F 12/0871* (2016.01)
*G06F 3/06* (2006.01)

(52) U.S. Cl.
CPC ...... *G06F 12/0802* (2013.01); *G06F 12/0246* (2013.01); *G06F 12/0871* (2013.01); *G06F 3/0631* (2013.01); *G06F 3/0653* (2013.01); *G06F 3/0683* (2013.01); *G06F 2212/1044* (2013.01); *G06F 2212/7205* (2013.01)

(58) Field of Classification Search
CPC ............. G06F 12/0871; G06F 12/0873; G06F 12/0802; G06F 12/0246; G06F 2212/1044; G06F 2212/7205; G06F 3/0604; G06F 3/0629; G06F 3/0631; G06F 3/0653; G06F 3/0683
USPC ......................................... 711/113, 129, 130
See application file for complete search history.

(56) References Cited

U.S. PATENT DOCUMENTS

| 8,176,235 | B2 | 5/2012 | Franceschini et al. |
| 8,244,960 | B2 | 8/2012 | Paley et al. |
| 8,285,918 | B2 | 10/2012 | Maheshwari |
| 8,583,783 | B1 * | 11/2013 | Hayward ............ G06F 12/0253 707/813 |

(Continued)

FOREIGN PATENT DOCUMENTS

WO    2014015409 A1    1/2014

OTHER PUBLICATIONS

Jung M., Prabhakar R., and Kandemir M.T., "Taking garbage collection overheads off the critical path in SSDs", Dec. 3-7, 2012, Proceedings of the 13th International Middleware Conference, Montreal, Quebec, Canada.*
Lee J., Kim Y., Shipman G.M., Oral S., Wang F., and Kim J., "A semi-preemptive garbage collector for solid state drives", Apr. 10-12, 2011, Proceedings of the IEEE International Symposium on Performance Analysis of Systems and Software, p. 12-21.*
Pending CN Application No. 201410602434.9, filed on Oct. 31, 2014, entitled: "Cache Allocation for Disk Array", pp. 1-34.
Lee et al., "Improving Performance and Lifetime of Solid-State Drives Using Hardware-Accelerated Compression", IEEE Transactions on Consumer Electronics, vol. 57, No. 4, Nov. 2011, pp. 1732-1739.

(Continued)

*Primary Examiner* — Reginald Bragdon
*Assistant Examiner* — Aaron D Ho
(74) *Attorney, Agent, or Firm* — L. Jeffrey Kelly

(57) ABSTRACT

A method for allocating cache for a disk array includes monitoring an I/O distribution of the disk array in a predetermined time period, determining a garbage collection state of the disk array, the garbage collection state allows the disk array to perform a garbage collection and prevents the disk array to perform the garbage collection, and determining an allocation of the cache based on the I/O distribution and the garbage collection state.

18 Claims, 6 Drawing Sheets

(56) References Cited

U.S. PATENT DOCUMENTS

| | | |
|---|---|---|
| 2008/0155190 A1 | 6/2008 | Ash et al. |
| 2012/0239853 A1 | 9/2012 | Moshayedi |
| 2014/0032817 A1* | 1/2014 | Bux .................. G06F 12/0246 711/103 |
| 2014/0143516 A1* | 5/2014 | Dawson .............. G06F 12/0253 711/171 |
| 2014/0240335 A1* | 8/2014 | Hu ...................... G06F 12/0246 345/543 |
| 2014/0281143 A1* | 9/2014 | Shivashankaraiah ...................... G06F 12/0253 711/103 |
| 2015/0026429 A1* | 1/2015 | Bobroff .............. G06F 12/0253 711/171 |
| 2015/0193144 A1 | 7/2015 | Bilas et al. |
| 2015/0347296 A1* | 12/2015 | Kotte ................. G06F 12/0269 711/103 |
| 2017/0161199 A1 | 6/2017 | Shah et al. |

OTHER PUBLICATIONS

Wang et al., "Exploit Real-time Fine-grained Access Patterns to Partition Write Buffer to Improve SSD Performance and Life-span", 2013 IEEE, pp. 1-7.

Prabhakar et al., "Dynamic storage cache allocation in multi-server architectures", SC '09 Proceedings of the Conference on High Performance Computing Networking, Storage and Analysis, Article No. 8, Portland, Oregon, Nov. 14-20, 2009, DOI: 10.1145/1654059.1654068, 12 pages.

* cited by examiner

CACHE ALLOCATION FOR DISK ARRAY

BACKGROUND

The present disclosure relates to the technical field of disk array, and more specifically, to a device and a method for allocating cache for a disk array.

Currently, a storage system generally uses disk arrays consisting of multiple disks. According to standard disk array technologies, cache allocation for an I/O operation in a disk array is usually based on a static method. The static method typically includes cache with a fixed size that is allocated to some disk array during a certain time period.

An important trend in current disk array technologies is the use of solid-state drives (SSDs) based on NAND flash memory to form a disk array. In NAND flash memory, the storage unit is divided into pages, and the pages constitute blocks. The writing to and reading from the NAND flash memory are processed in terms of blocks and/or pages, and before data is written to a page, the content in the page must be first erased. Due to these characteristics, traditional cache allocation technologies may have a large influence on the performance of NAND flash memory-based disk arrays.

SUMMARY

According to one aspect of the present disclosure, a method for allocating cache for a disk array, may include: monitoring the I/O distribution of the disk array in a predetermined time period; determining the garbage collection state of the disk array, the garbage collection state including allowing the disk array to perform garbage collection and not allowing the disk array to perform garbage collection; determining the allocation of the cache based on the I/O distribution and the garbage collection state.

According to another aspect of the present disclosure, a device for allocating cache for a disk array, may include: an I/O distribution monitor configured to monitor the I/O distribution of the disk array in a predetermined time period; a garbage collection state determiner configured to determine the garbage collection state of the disk array, the garbage collection state including allowing the disk array to perform garbage collection and not allowing the disk array to perform garbage collection; a cache allocation controller configured to determine the allocation of the cache based on the I/O distribution and the garbage collection state.

According to yet another aspect of the present disclosure, a computer program product for allocating cache for a disk array. The computer program product may include a storage medium which can be accessed by a computer and store instructions which are executed by the computer to perform each step of the method for allocating cache for a disk array provided by the above aspect of the present disclosure.

According to the device and method of the present disclosure, it may be possible to balance a total cache amount between a busy time and a free time in order to minimize the influence of garbage collection in the disk I/O.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In disk arrays based on NAND flash memory, before data is written to a page, the content in the page must be first erased. This process may be referred to as garbage collection. Considering the influence of the garbage collection of a disk in the performance of the I/O operation of the disk, embodiments of the present disclosure may provide a cache allocation mechanism which may allow to allocate cache for a disk array based on distribution of the disk array and the garbage collection state of disks.

Figure 1:
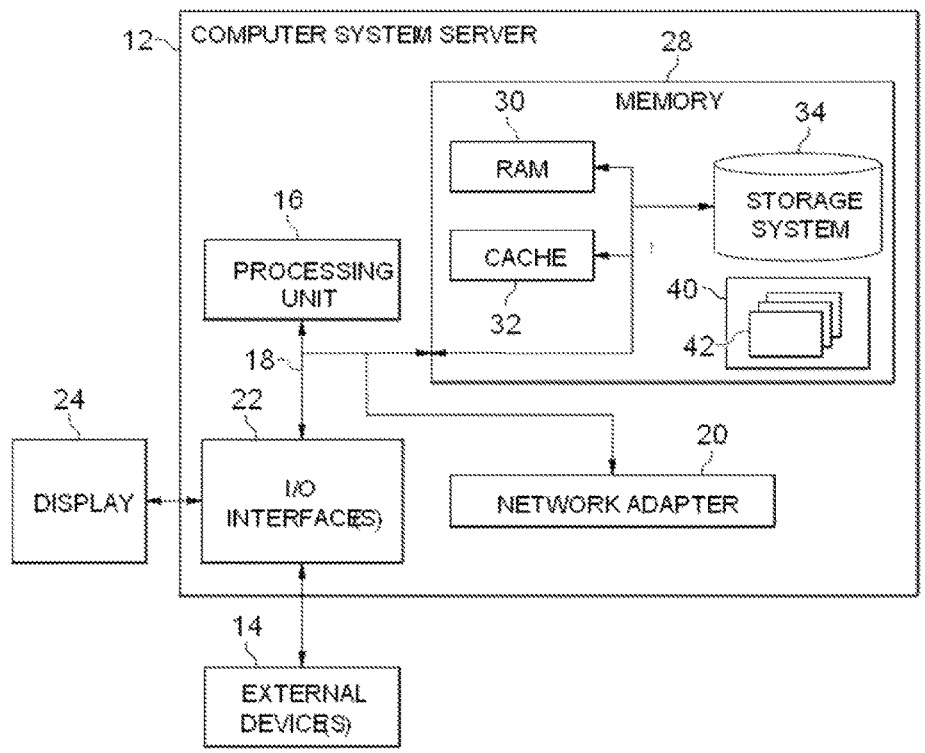
FIG. 1 depicts a block diagram of an exemplary computer system/server, according to an embodiment of the present disclosure.

Referring now to FIG. 1, an exemplary computer system/server 12 is shown, according to an embodiment of the present disclosure. It should be noted that the computer system/server 12 is only illustrative and is not intended to suggest any limitation as to the scope of use or functionality of embodiments of the disclosure described herein.

The computer system/server 12 may include a general-purpose computing device. The components of the computer system/server 12 may include, but are not limited to, one or more processors or processing units 16, a system memory 28, and a bus 18 that couples various system components including the system memory 28 to the processing unit (or processor) 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 may typically include a variety of computer system readable media. Such media may be any available media that is accessible by the computer system/server 12, including volatile and non-volatile media, removable and non-removable media.

The system memory 28 may include computer system readable media in the form of volatile memory, such as a random access memory (RAM) 30 and/or a cache memory 32. The computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 18 by one or more data media interfaces. As will be further depicted and described below, the system memory 28 may include at least one program product having a set (e.g., at least one) of program modules that are configured to carry out the functions of the embodiments of the present disclosure.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of the embodiments of the present disclosure as described herein.

The computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. The computer system/server 12 may also communicate with one or more networks such as a local area network (LAN), a general wide area network (WAN), and/or a public network (e.g., the Internet) via network adapter 20. As depicted, network adapter 20 communicates with the other components of the computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

According to an embodiment of the present disclosure, in the disk array of a storage system, the allocation of caches may be dynamically adjusted based on an I/O density distribution model and the garbage collection state of the disk array. Generally, the proposed cache allocation mechanism follows the following aspects: 1) The higher the I/O density of a disk array reaches, the more cache needs to be allocated for the disk array, 2) Once a disk array is allowed to perform garbage collection, the cache allocated to the disk array needs to be enlarged to balance the cache allocation for all the disk arrays based on the garbage collection state of each disk array.

Figure 2:
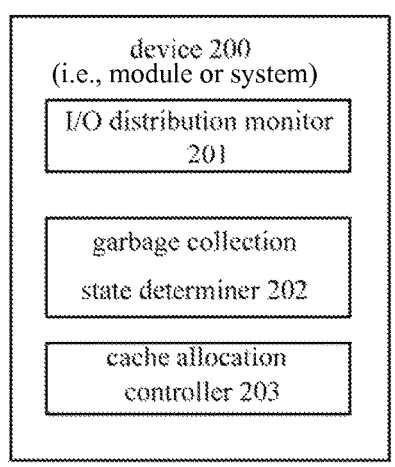
FIG. 2 is a schematic block diagram of a device for allocating cache for a disk array, according to an embodiment of the present disclosure.

Referring now to FIG. 2, a schematic block diagram of a device (i.e., module or system) 200 for allocating cache for a disk array is shown, according to an embodiment of the present disclosure. The device 200 may include, for example, an I/O distribution monitor 201 configured to monitor the I/O distribution of the disk array in a predetermined time period; a garbage collection state determiner 202 configured to determine the garbage collection state of the disk array, the garbage collection state including allowing the disk array to perform garbage collection and not allowing the disk array to perform garbage collection; a cache allocation controller 203 configured to determine the allocation of the cache based on the I/O distribution and the garbage collection state. The device 200 may be implemented by the computer system/server 12 shown in FIG. 1.

Most enterprise services have relatively busy time periods and relatively free time periods, so the I/O data density distribution model may be acquired from daily I/O data density allocation. For example, the I/O distribution monitor 201 may be configured to record and update the I/O distribution of the disk array for 24 hours (i.e., the predetermined time period) every day. The garbage collection state determiner 202 may be configured to determine the garbage collection state of the disk array, that is, to determine whether to allow the disk array to perform garbage collection. The cache allocation controller 203 may determine the allocation of cache based on the above I/O distribution and the garbage collection state of the disk array.

In the present disclosure, some terms related to the I/O data density of the disk array are defined as follows:

"Busy" means that the I/O data density of the disk array is high in a period of time. For example, the I/O data density is larger than or equal to a predetermined threshold. The magnitude of the above determined threshold does not limit the scope of the present disclosure, which may be appropriately set by those skilled in the art according to system performance of the disk array and requirements in other aspects. According to one embodiment of the present disclosure, the predetermined threshold may be set as, but not limited to, 60% of the largest system I/O density.

"Free" means that the I/O data density of the disk array is small in a period of time. For example, the I/O data density is smaller than the above predetermined threshold.

It may be understood from the description above that the disk array should be at either a busy or a free state.

According to one embodiment of the present disclosure, the garbage collection state determiner 202 may be configured to determine the garbage collection state of the disk array based on the I/O distribution of the disk array, the I/O distribution of other disk arrays and/or the garbage collection state of other disk arrays.

Figure 3:
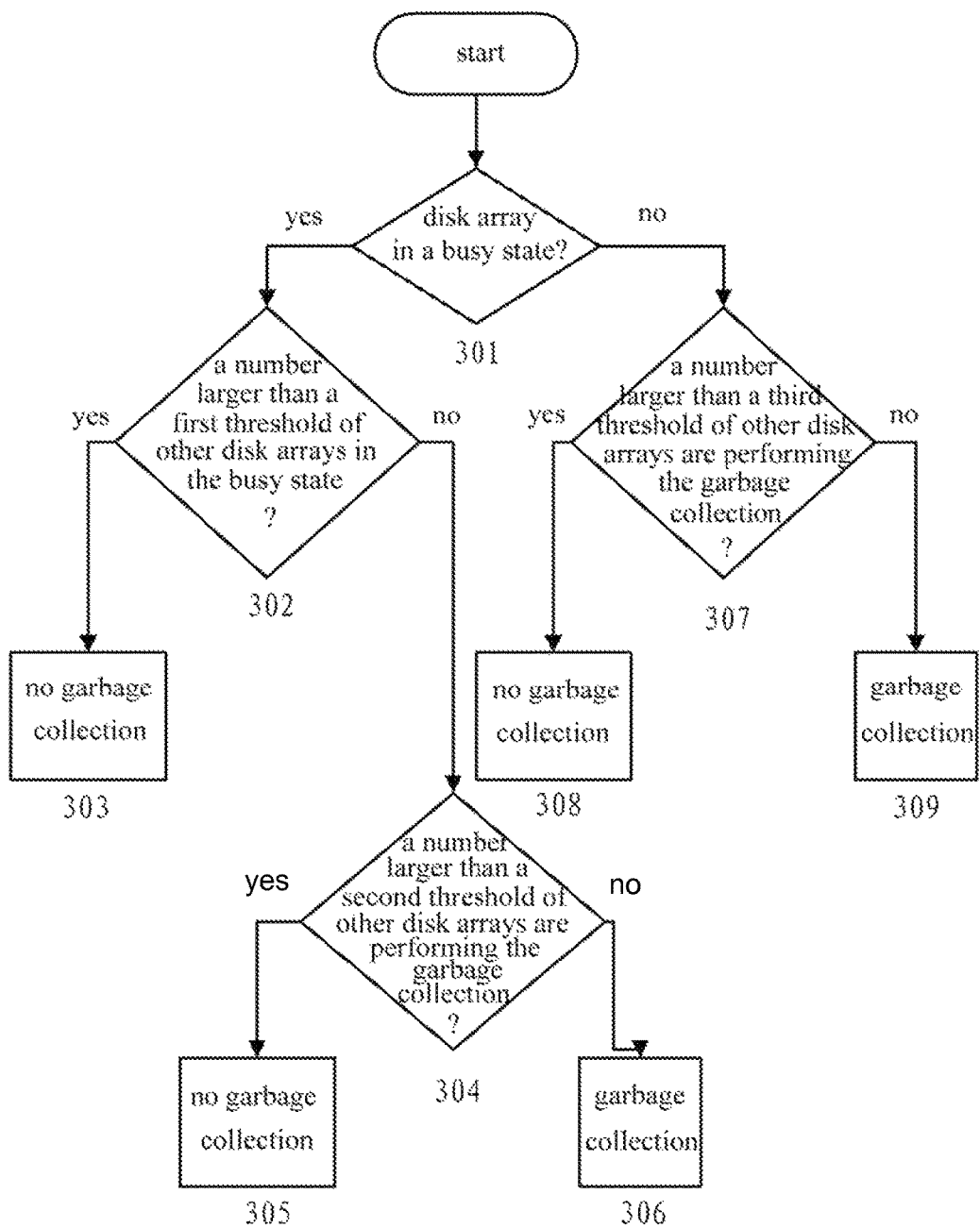
FIG. 3 is an exemplary operational diagram for determining a garbage collection state by a garbage collection state determiner, according to an embodiment of the present disclosure.

Referring now to FIG. 3, an exemplary operational diagram for determining the garbage collection state by the garbage collection state determiner is shown, according to an embodiment of the present disclosure. To determine the garbage collection state, operation 301 is executed first, more specifically, at operation 301 it is determined whether (the I/O distribution of) the disk array is in the "busy" state or the "free" state.

When the result of the operation 301 is that the disk array is in the "busy" state, operation 302 is then performed, more specifically, at operation 302 it is determined if other disk arrays are in the "busy" state or the "free" state. When the result of the operation 302 is that a number larger than a threshold (also referred to as a first threshold hereafter) of other disk arrays are also in the "busy" state, operation 303 is performed. At operation 303, the garbage collection state determiner 202 (FIG. 2) does not allow the disk array to perform garbage collection in response to the I/O distribution of the disk array being in the busy state, and to the I/O distribution of a number larger than the first threshold of other disk arrays being also in the busy state.

The magnitude of the above first threshold does not limit the scope of the present disclosure. The first threshold may be appropriately set by those skilled in the art according to system performance of the disk array and requirements in other aspects. According to one embodiment of the present disclosure, the first threshold may be set as, but not limited to, approximately 50% or a higher or lower value.

When the result of the operation 302 is that a number larger than the first threshold of other disk arrays are in the "free" state, operation 304 is performed. In the operation 304, it is determined whether a number larger than another threshold (referred to as a second threshold hereafter) of other disk arrays are performing the garbage collection. When the determination result of the operation 304 is that a number larger than the second threshold of other disk arrays are performing the garbage collection, operation 305 is performed. More specifically, at operation 305, the garbage collection state determiner 202 (FIG. 2) does not allow the disk array to perform the garbage collection in response to the I/O distribution of the disk array being in the busy state, the I/O distribution of a number larger than the first threshold of other disk arrays being in the free state, and a number larger than the second threshold of other disk arrays performing the garbage collection.

The magnitude of the above second threshold does not limit the scope of the present disclosure. The second threshold may be appropriately set by those skilled in the art according to system performance of the disk array and requirements on other aspects. According to one embodiment of the present disclosure, the second threshold may be set as, but not limited to, approximately 50% or a higher or lower value.

When the determination result of the operation 304 is that a number larger than the second threshold of other disk arrays are not performing the garbage collection, operation 306 is performed, that is, the garbage collection state determiner 202 (FIG. 2) allows the disk array to perform the garbage collection in response to the I/O distribution of the disk array being in the busy state, the I/O distribution of a number larger than the first threshold of other disk arrays being in the free state, and a number larger than the second threshold of other disk arrays not performing the garbage collection.

When the determination result of the operation 301 is that the disk array is in the "free" state, operation 307 is performed. Then, at operation 307, it is determined whether other disk arrays are performing the garbage collection process. When the determination result of the operation 307 is that a number larger than yet another threshold (referred to as a third threshold hereafter) of other disk arrays are performing the garbage collection process, operation 308 is performed, that is, the garbage collection state determiner 202 (FIG. 2) does not allow the disk array to perform garbage collection in response to the I/O distribution of the disk array being in the free state, and a number larger than the third threshold of other disk arrays are performing the garbage collection.

The magnitude of the above third threshold does not limit the scope of the present disclosure. The third threshold may be appropriately set by those skilled in the art according to system performance of the disk array and requirements on other aspects. According to one embodiment of the present disclosure, the third threshold may be set as, but not limited to, approximately 50% or a higher or lower value.

According to embodiments of the present disclosure, the above first threshold, the second threshold and the third threshold may be set as the same value, but may also be set in a way such that at least one of them is different.

When the determination result of the operation 307 is that a number larger than the third threshold of other disk arrays are not performing the garbage collection process, the operation 309 is performed, that is, the garbage collection state determiner 202 (FIG. 2) allows the disk array to perform the garbage collection in response to the I/O distribution of the disk array being in the free state and a number larger than the third threshold of other disk arrays are not performing the garbage collection.

In other words, if the I/O distribution of the disk array is in the busy state, the garbage collection is not recommended unless the I/O distribution of a number larger than the first threshold of other disk arrays is in the free state and a number larger than the second threshold of other disk arrays are not performing the garbage collection. If the I/O distribution of the disk array is in the free state, the garbage collection is recommended unless a number larger than the third threshold of other disk arrays are performing the garbage collection.

Figure 4:
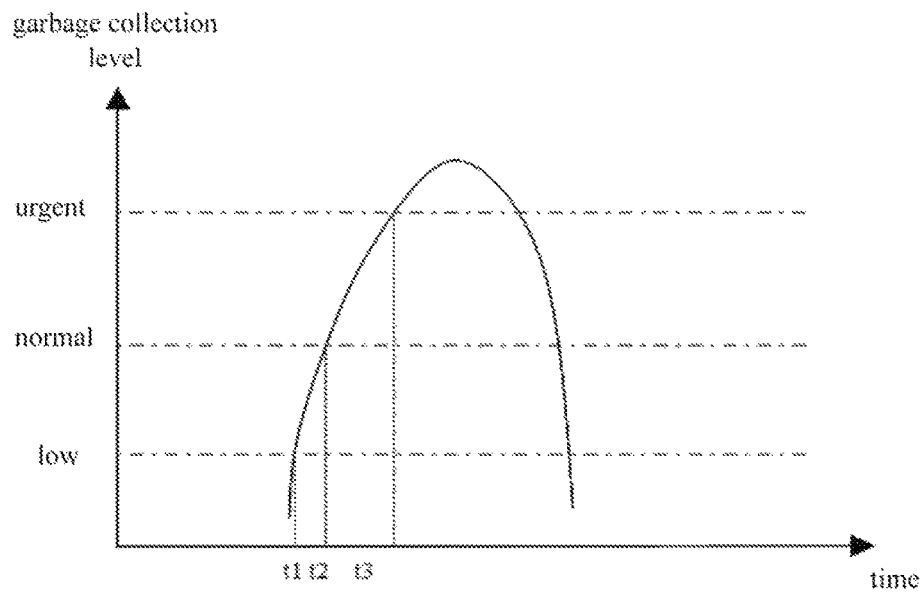
FIG. 4 is a schematic diagram of determining the garbage collection state based on the garbage collection level according to another embodiment of the present disclosure.

Referring now to FIG. 4, a schematic diagram for determining the garbage collection state based on the garbage collection level is shown, according to another embodiment of the present disclosure. In this embodiment, the garbage collection state determiner 202 (FIG. 2) may collect the state information of each disk in a disk array. The state information may contain the garbage collection level of the disk. The garbage collection state determiner 202 (FIG. 2) may also determine whether to perform the garbage collection based on the garbage collection level of the disk array. The garbage collection level may be for example "urgent", "normal" or "low". With the increase of the used time in the disk array, availability of storage blocks in the disk array may substantially decrease. For example, as shown in FIG. 4, at time t1, there are many available storage blocks in the disk array, and at this time, the garbage collection level is "low" and it may not be necessary to perform the garbage collection process. With the disk array being used continuously, at for example time t2, available storage blocks in the disk array are further reduced, but there are still some storage blocks available. Therefore, it may be possible to delay the garbage collection process for a certain period of time, and the garbage collection level at this time is "normal". As the disk array is further used, at for example time t3, available storage blocks in the disk array is already below a certain threshold. At this time, the garbage collection level is "urgent", so at this point, it may be necessary to perform the garbage collection process on the disk array right away.

The magnitude of the above "certain threshold" does not limit the scope of the present disclosure, and it may be appropriately set by those skilled in the art according to system performance of the disk array and requirements in other aspects.

According to one embodiment of the present disclosure, when the garbage collection level of the disk array is "urgent", the garbage collection state determiner 202 (FIG. 2) may determine the garbage collection state of the disk array to be "allowing the garbage collection". When the garbage collection level of the disk array is "low", the garbage collection state determiner 202 (FIG. 2) may determine the garbage collection state of the disk array to be "not allowing the garbage collection". When the garbage collection level of the disk array is "normal", the garbage collection state determiner 202 (FIG. 2) may configure whether to determine the garbage collection state of the disk array to be "allowing the garbage collection" or "not allowing the garbage collection" in advance based on the requirements of the system performance.

The above described embodiments illustrates a method by which the garbage collection state determiner 202 (FIG. 2) may determine the garbage collection state. However, the above described method of determining the garbage collection state do not limit the scope of the present disclosure. Those skilled in the art may determine the garbage collection state of the disk array based on other ways, such as specific requirements of the system performance or by specifying a specific time period. For example, those skilled in the art may specify that the garbage collection is allowed to be performed in a time period when the disk array is relatively free, and the garbage collection is not allowed to be performed in a time period when the disk array is relatively busy.

Figure 5:
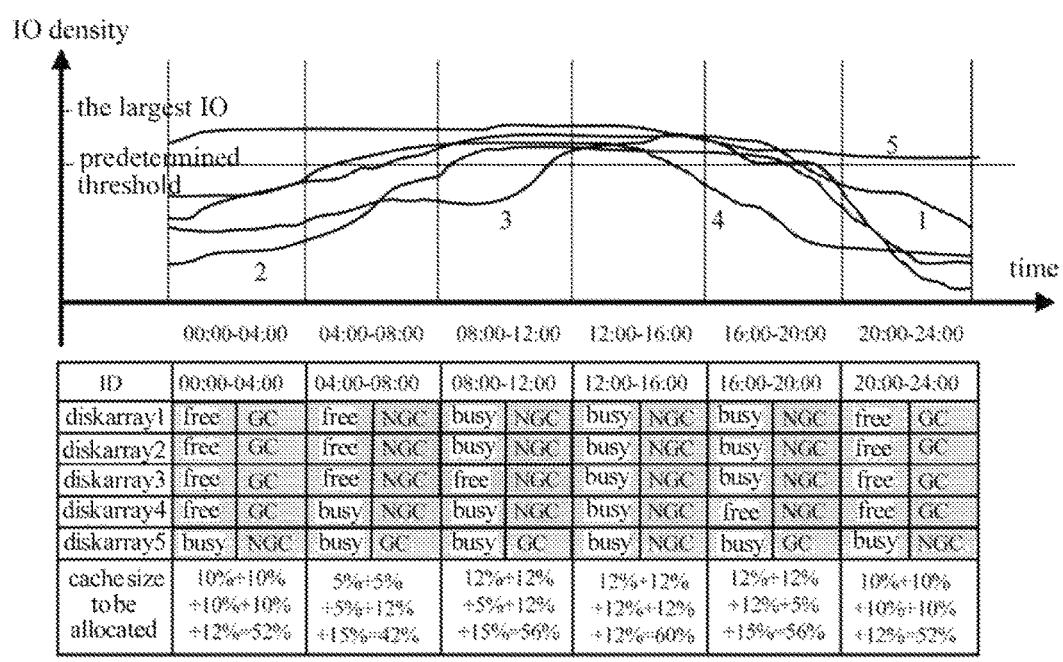
FIG. 5 depicts an exemplary diagram of the garbage collection state and I/O distribution of multiple disk arrays in a time period, according to an embodiment of the present disclosure.

Referring now to FIG. 5, an exemplary diagram of the garbage collection state and the I/O distribution of multiple disk arrays in a specific time period is shown, according to an embodiment of the present disclosure.

The upper part of FIG. 5 shows the I/O distribution curves of several disk arrays (e.g. disk arrays 1, 2, 3, 4 and 5) in a range of 24 hours. More specifically, FIG. 5 presents the I/O distribution of the disk arrays versus the largest I/O density in the system. The lower part of FIG. 5 shows the I/O states presented by "busy" and "free" states, the garbage collection states (in FIG. 5, "GC" represents allowing the garbage collection, and "NGC" represents not allowing the garbage collection), and the size of cache allocated to each disk array in each time period, among for example the disk arrays 1, 2, 3, 4, and 5 in the range of 24 hours.

According to an embodiment of the present disclosure, as shown in FIG. 5, the garbage collection is allowed in the time period when the disk array is in the free state (for example 00:00-04:00), and the garbage collection is not allowed in the time period when the disk array is in the busy state (for example 12:00-16:00). However, if the disk array is always in the busy state, the garbage collection is allowed to be performed on this disk array in a time period when this disk array in the busy state but other disk arrays are in the free state and not performing the garbage collection (for example 04:00-08:00). As such, the cache allocation for all disk arrays may still be a relatively stable value. With the proposed allocation method, it may be possible to achieve the purpose of balancing the total cache amount allocated at busy time and free time, and minimize the influence of the garbage collection process on the disk I/O.

According to one embodiment of the present disclosure, the cache allocated for each disk array may be limited to, for example, 20% of the total cache, and the size of the cache allocated for each disk array may be defined based on the I/O density distribution and the garbage collection state. According to one embodiment of the present disclosure, the cache allocation controller 203 (FIG. 2) may allocate the largest cache size for the disk array in response to the disk array being in the busy state and allowing the garbage collection (for example, the garbage collection level of the disk array at this time is "urgent"), and allocate the smallest cache size for the disk array in response to the disk array being in the free state and not allowing the garbage collection (for example, the garbage collection level of the disk array at this time is "low"), as shown in Table 1 below.

TABLE 1

| States: | Cache size to be allocated |
|---|---|
| I/O is busy & GC is allowed | area 1 (forward diagonal "/"): allocating the largest cache, e.g. 15% |
| I/O is busy & GC is not allowed | area 1 (backward diagonal "\"): allocating relatively larger cache, e.g. 12% |
| I/O is free & GC is allowed | area 1 (horizontal lines "—"): allocating relatively smaller cache, e.g. 10% |
| I/O is free & GC is not allowed | area 1 (vertical lines "|"): allocating the smallest cache, e.g. 5% |

For example, referring to Table 1 above, the cache allocation of all disk arrays 1-5 may be analyzed by taking the time period of 08:00-12:00 as an example. For disk arrays 1,2 and 4, since they are in the busy state and the garbage collection is not allowed, cache size of 12% of the total cache is allocated. For disk array 3, since it is in the free state and the garbage collection is not allowed, cache size of 5% of the total cache is allocated. For disk array 5, since it is in the busy state and the garbage collection is allowed, cache size of 15% of the total cache is allocated. As such, in the time period of 08:00-12:00, the cache size allocated for the whole disk array system is 56% of the total cache.

The cache size allocated for the whole disk array system in other time periods in Table 1 is as shown in FIG. 5, and detailed analysis will be omitted.

According to another embodiment of the present disclosure, the I/O distribution monitor may also be configured to monitor the I/O distribution online in real time, such that the cache allocation controller 203 (FIG. 2) may adjust the cache allocation based on the real-time I/O density of the disk array and the garbage collection state determined by the garbage collection state determiner 202 (FIG. 2).

Figure 6:
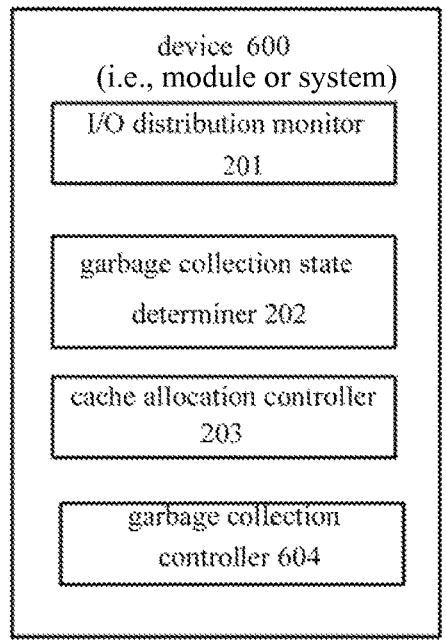
FIG. 6 is a schematic block diagram showing a device for allocating cache for a disk array, according to another embodiment of the present disclosure.

Referring now to FIG. 6, a schematic block diagram depicting a device (i.e., module or system) 600 for allocating cache for the disk array is shown, according to another embodiment of the present disclosure. The device 600 may differ from the device 200 (FIG. 2) described above in that, in addition to the I/O distribution monitor 201, the garbage collection state determiner 202, and the cache allocation controller 203, the device 600 may further include a garbage collection controller 604 configured to control the garbage collection operation performed on the disk array.

Figure 7:
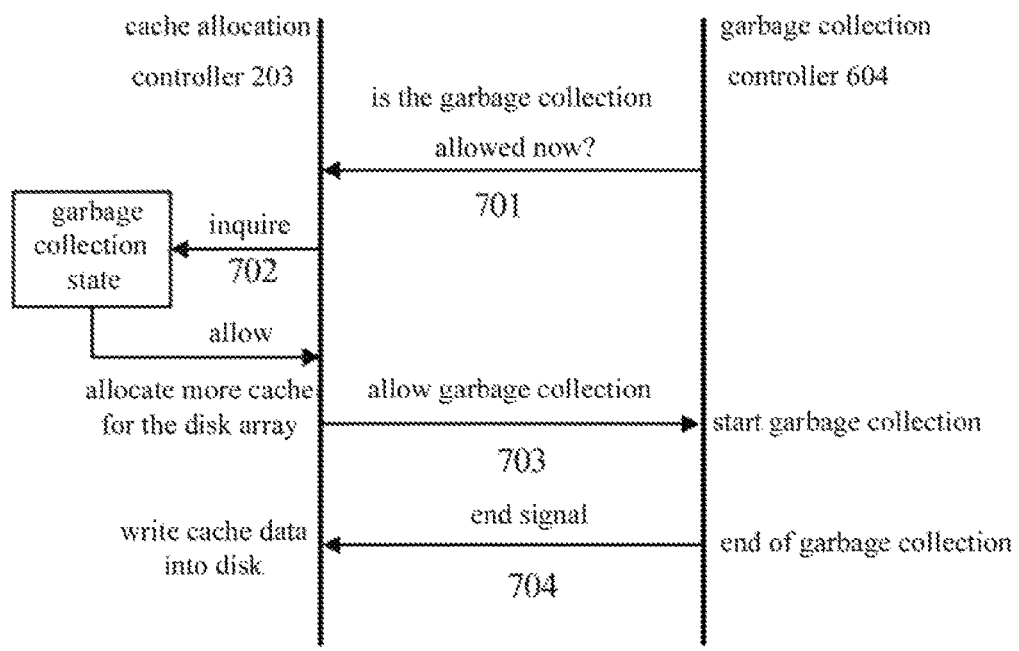
FIG. 7 is an operation time sequence diagram of garbage collection and cache allocation between the garbage collection controller and the cache allocation controller, according to an embodiment of the present disclosure.

Referring now to FIG. 7, an operation time sequence diagram of the garbage collection and cache allocation performed between the garbage collection controller 604 (FIG. 6) and the cache allocation controller 203 (FIG. 6) is shown, according to an embodiment of the present disclosure.

As depicted in the figure, when a disk array is ready to perform the garbage collection, at operation 701, the garbage collection controller 604 (FIG. 6) sends a garbage collection request signal to the cache allocation controller 203 (FIG. 6) to request for the garbage collection. At operation 702, the cache allocation controller 203 (FIG. 6) inquires the garbage collection state. If the garbage collection state is "allowing garbage collection", at operation 703, the cache allocation controller 203 (FIG. 6) sends a confirmation signal to the garbage collection controller 604 (FIG. 6) to inform that the garbage collection is allowed, and allocates more cache to the disk array. The size of the above allocated cache may be determined according to the method of the above various embodiments in the present disclosure. After the garbage collection is finished, at operation 704, the garbage collection controller 604 (FIG. 6) sends an end signal to the cache allocation controller 203 (FIG. 6), and the cache allocation controller 203 (FIG. 6) writes data storing in the cache during the garbage collection into the disk array.

Figure 8:
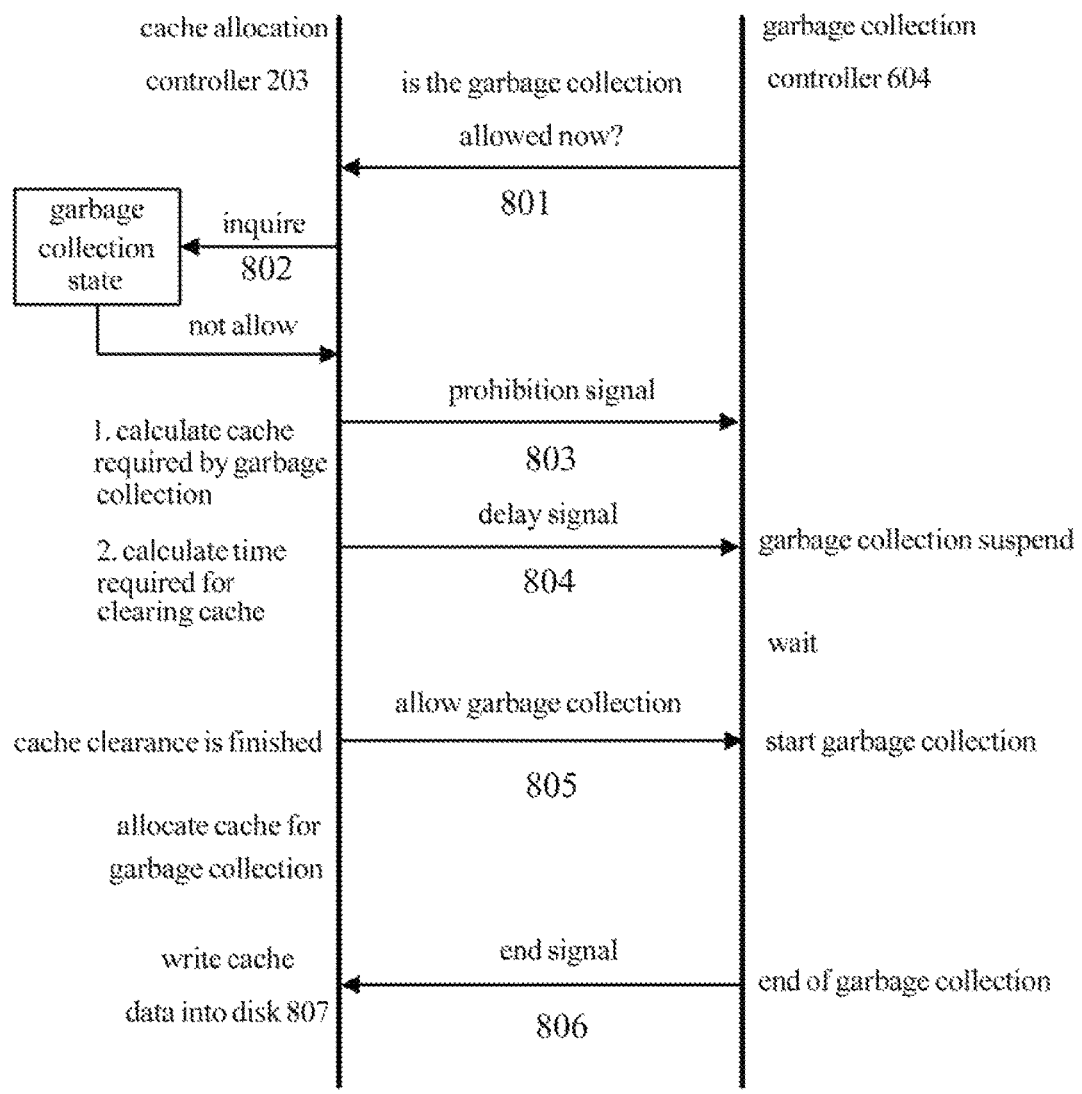
FIG. 8 is an operation time sequence diagram of garbage collection and cache allocation between the garbage collection controller and the cache allocation controller, according to another embodiment of the present disclosure.

Referring now to FIG. 8, a time sequence diagram of the garbage collection and the cache allocation performed between the garbage collection controller 604 (FIG. 6) and the cache allocation controller 203 (FIG. 6) is shown, according to another embodiment of the present disclosure.

As depicted in the figure, when a disk array is ready to perform the garbage collection, at operation 801, the garbage collection controller 604 (FIG. 6) sends a garbage collection request signal to the cache allocation controller 203 (FIG. 6) to request for the garbage collection. At operation 802, the cache allocation controller 203 (FIG. 6) inquires the garbage collection state. If the garbage collection state is "not allowing garbage collection", at operation 803, the cache allocation controller 203 (FIG. 6) sends a prohibition signal to the garbage collection controller 604 (FIG. 6) to inform that the garbage collection is not allowed. If the garbage collection process is not allowed, at operation 804, the cache allocation controller 203 (FIG. 6) calculates the cache size required by the requested garbage collection and the time required for clearing data in the cache for the garbage collection, and sends a delay signal to the garbage collection controller 604 (FIG. 6). In this case, the garbage collection controller 604 (FIG. 6) is in the wait state without performing the garbage collection process. At the same time, the cache allocation controller 203 (FIG. 6) writes data in the cache to be cleared into other disk arrays to reserve enough cache for the garbage collection. After the cache clearance is over, at operation 805, the cache allocation controller 203 (FIG. 6) sends a confirmation signal indicating that the garbage collection may be performed to the garbage collection controller 604 (FIG. 6), and allocates cache for the garbage collection to the disk array. The size of the above cache allocated for the garbage collection may be determined according to the proposed method. After the garbage collection is finished, at operation 804, the garbage collection controller 604 (FIG. 6) sends an end signal at operation 806 to the cache allocation controller 203 (FIG. 6). At operation 807, the cache allocation controller 203 (FIG. 6) writes data storing in the cache during the garbage collection into the disk array.

The above operations and their order are only exemplary, and whether part of the operations need to be performed and in which order they are performed do not limit the scope of the present disclosure. For example, but not for limitation, the prohibition signal in operation 803 may not be sent.

According to one embodiment of the present disclosure, the formula for calculating cache to be allocated is as follows:

$$(T/\text{Maximum GC Time})*W1+W2*((\text{High Cache usage-Current Cache usage})/(\text{High Cache Usage-Low Cache usage}))+W3*(\text{Average Rank Workload/Maximum Workload})$$

where, "T" represents time for the garbage collection process from the garbage collection controller 604 (FIG. 6); "Maximum GC Time" represents the largest garbage collection time which is a constant value; "W1" represents the cache increase percentage based on time; "W2" is a constant value based on overall cache usage ratio; "High Cache usage" represents the high cache usage ratio, which is normally defined as 80% (the remaining 20% is backup cache); "Low Cache usage" represents the low cache usage ratio, which is normally defined as 20%; "Current cache usage" represents the cache usage ratio when preparing for the garbage collection; "W3" represents a value based on workload of the disk array; "Average rank workload" represents the average workload of the disk array while performing the garbage collection; and "Maximum workload rank" represents the largest workload of the disk array.

The above definition for the high cache usage ratio and the low cache usage ratio does not limit the scope of the present disclosure, and those skilled in the art may set the above high cache usage ratio and low cache usage ratio as other values according to the requirement of the system performance and other related parameters.

When the size of the cache cannot satisfy the garbage collection, the policy is to select a disk array which is not busy, write the data in the cache into the disk array, and use the released cache for the garbage collection. When selecting the disk array which is not busy to be used, it is possible to apply a Round-Robin algorithm to each disk array which is not busy, as shown by the following exemplary small algorithm program.

```
While (Desired space < GC needed) {
    Round-Robin select one unbusy rank to do destage.
    Desired space =+Track size;
}
```

Figure 9:
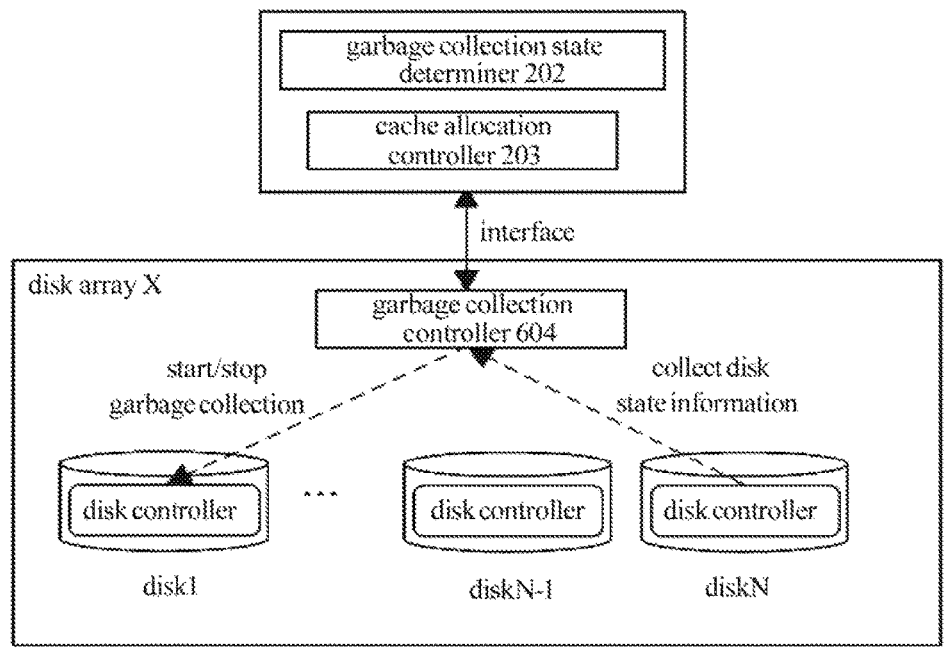
FIG. 9 depicts exemplary operations of the garbage collection controller and the cache allocation controller, according to yet another embodiment of the present disclosure.

Referring now to FIG. 9, exemplary operations between the garbage collection controller 604 (FIG. 6) and the cache allocation controller 203 (FIG. 6) are shown, according to yet another embodiment of the present disclosure. As depicted in the figure, the disk array may include multiple disks, for example, disk 1 . . . disk N−1, disk N, etc. Each of those disks may have a corresponding disk controller. The garbage collection controller 604 (FIG. 6) may have interfaces to communicate with other modules and may operate collaboratively with other modules. For example, the garbage collection controller 604 (FIG. 6) may have an interface to communicate with the garbage collection state determiner 202 (FIG. 6) and the cache allocation controller 203 (FIG. 6), and also may have an interface to communicate with the disk controller in each disk.

According to one embodiment of the present disclosure, the garbage collection controller 604 (FIG. 6) may control the garbage collection process of all disks in this disk array. The disk controller in each disk (e.g. SSD hard drive) may control the garbage collection process in the disk. The disk controller may collect the state information of all disks (SSD). The state information may contain for example the garbage collection level information. The garbage collection state determiner 202 (FIG. 6) may determine whether to allow the garbage collection based on the garbage collection level information.

The garbage collection controller 604 (FIG. 6) may control the disk controller in each disk to start and stop the garbage collection process based on an instruction for starting the garbage collection received from the cache allocation controller 203 (FIG. 6).

Figure 10:
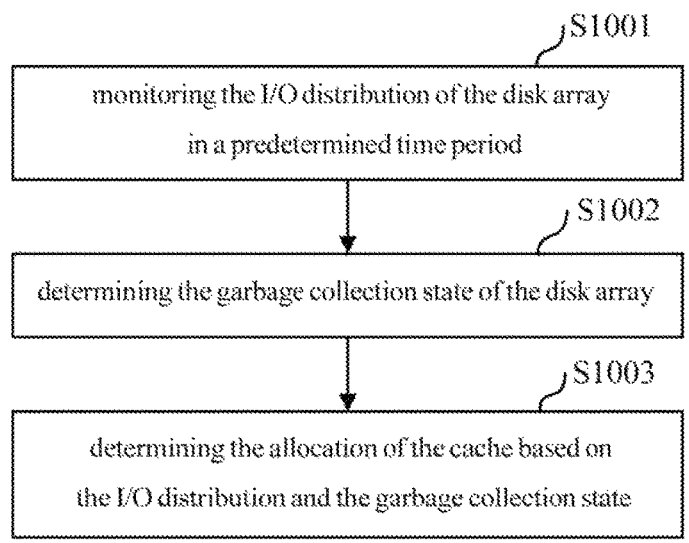
FIG. 10 is a flowchart showing a method for allocating cache for a disk array according to an embodiment of the present disclosure.

Referring now to FIG. 10, a flowchart depicting a method for allocating cache for a disk array is shown, according to an embodiment of the present disclosure. As depicted in the figure, at step S1001, the I/O distribution of the disk array in a predetermined time period is monitored. At step S1002, the garbage collection state of the disk array is determined, the garbage collection state including allowing the disk array to perform the garbage collection and preventing the disk array to perform the garbage collection. At step S1003, the allocation of the cache is determined based on the I/O distribution and the garbage collection state.

According to one embodiment of the present disclosure, in the above method, the step of determining the garbage collection state of the disk array includes determining the garbage collection state of the disk array based on the I/O distribution of the disk array, the I/O distribution of other disk arrays and/or the garbage collection state of other disk arrays.

According to one embodiment of the present disclosure, in the above method, the step of determining the garbage collection state of the disk array includes: the garbage collection state is preventing the disk array to perform the garbage collection in response to the I/O distribution of the disk array being in one of the following states: the I/O distribution of the disk array is in a busy state and the I/O distribution of a number larger than a first threshold of other disk arrays is also in the busy state; the I/O distribution of the disk array is in the busy state, the I/O distribution of a number larger than the first threshold of other disk arrays is in a free state, and a number larger than a second threshold of other disk arrays are performing the garbage collection; the I/O distribution of the disk array is in a free state and a number larger than a third threshold of other disk arrays are performing the garbage collection.

According to one embodiment of the present disclosure, in the above method, the step of determining the garbage collection state of the disk array includes: the garbage collection state is allowing the disk array to perform the garbage collection in response to the I/O distribution of the disk array being in one of the following states: the I/O distribution of the disk array is in a busy state, the I/O distribution of a number larger than a first threshold of other disk arrays is in a free state, and a number larger than a second threshold of other disk arrays are not performing the garbage collection; the I/O distribution of the disk array is in a free state and a number larger than a third threshold of other disk arrays are not performing the garbage collection.

According to one embodiment of the present disclosure, in the above method, the step of determining the garbage collection state of the disk array includes: determining whether to allow the disk array to perform the garbage collection based on the garbage collection level of the disk array.

According to one embodiment of the present disclosure, in the above method, the step of determining the allocation of the cache based on the I/O distribution and the garbage collection state includes: allocating the largest cache for the disk array in response to the I/O distribution of the disk array being in a busy state and allowing the garbage collection.

According to one embodiment of the present disclosure, in the above method, the step of determining the allocation of the cache based on the I/O distribution and the garbage collection state includes: allocating the smallest cache for the disk array in response to the I/O distribution of the disk array being in a free state and not allowing the garbage collection.

According to one embodiment of the present disclosure, the above method further includes: receiving a garbage collection request signal; inquiring the garbage collection state; sending a garbage collection confirmation signal, obtaining the cache to be allocated determined by the above methods, and allocating the cache to be allocated to the disk array, in response to the garbage collection state is allowing the disk array to perform the garbage collection.

According to one embodiment of the present disclosure, the above method further includes: sending a garbage collection delay signal, and writing the data of the cache to be cleared into other disk arrays, in response to the garbage collection state being not allowing the disk array to perform the garbage collection; sending the garbage collection confirmation signal, obtaining the cache to be allocated determined by the above methods, and allocating the cache to be allocated to the disk array, in response to the writing of the data of the cache to be cleared being finished.

According to one embodiment of the present disclosure, the above method further includes: writing the data in the allocated cache into the disk array in response to the garbage collection being finished.

The various embodiments of the present disclosure are described in connection with the figures above.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention has been described with reference to the accompanying drawings. The present invention is not limited to these embodiments, however. Also, the present invention may be embodied with various improvements, modifications, and variations on the basis of the expertise of a person ordinarily skilled in the art to which the invention pertains without departing from the spirit of the invention.

What is claimed is:

1. A method for allocating cache for a disk array, the method comprising:
    monitoring an I/O distribution of the disk array in a predetermined time period;
    determining a garbage collection state of the disk array;
    preventing, by the garbage collection state, the disk array from performing the garbage collection in response to the I/O distribution of the disk array being in one of the following states:
        the I/O distribution of the disk array is in a busy state and an I/O distribution of a number larger than a first threshold of other disk arrays is also in the busy state;
        the I/O distribution of the disk array is in the busy state, the I/O distribution of the number larger than the first threshold of other disk arrays is in a free state, and a number larger than a second threshold of other disk arrays are performing the garbage collection; or the I/O distribution of the disk array is in a free state and a number larger than a third threshold of other disk arrays are performing the garbage collection; and determining an allocation of the cache based on the I/O distribution and the garbage collection state.

2. The method according to claim 1, wherein determining the garbage collection state of the disk array comprises:
determining the garbage collection state of the disk array based on the I/O distribution of the disk array, an I/O distribution of other disk arrays or a garbage collection state of other disk arrays.

3. The method according to claim 1, further comprising:
allowing, by the garbage collection state, the disk array to perform the garbage collection in response to the I/O distribution of the disk array being in one of the following states:
the I/O distribution of the disk array is in a busy state, an I/O distribution of a number larger than a first threshold of other disk arrays is in a free state, and a number larger than a second threshold of other disk arrays are not performing the garbage collection; or
the I/O distribution of the disk array is in a free state and a number larger than a third threshold of other disk arrays are not performing the garbage collection.

4. The method according to claim 1, wherein the determining the garbage collection state of the disk array comprises:
determining whether to allow the disk array to perform the garbage collection based on a garbage collection level of the disk array.

5. The method according to claim 1, wherein determining the allocation of the cache based on the I/O distribution and the garbage collection state comprises:
allocating a largest cache for the disk array in response to the I/O distribution of the disk array being in a busy state and allowing the garbage collection.

6. The method according to claim 1, wherein determining the allocation of the cache based on the I/O distribution and the garbage collection state comprises:
allocating a smallest cache for the disk array in response to the I/O distribution of the disk array being in a free state and preventing the garbage collection.

7. The method according to claim 1, further comprising:
receiving a garbage collection request signal;
inquiring the garbage collection state;
allowing the disk array to perform the garbage collection, in response to the garbage collection state;
sending a garbage collection confirmation signal;
obtaining the cache to be allocated; and
allocating the obtained cache to the disk array.

8. The method according to claim 7, further comprising:
preventing the disk array from performing the garbage collection, in response to the garbage collection state;
sending a garbage collection delay signal; and
writing data to be cleared from the cache into other disk arrays.

9. The method according to claim 8, wherein writing the data to be cleared from the cache into other disk arrays comprises:
sending the garbage collection confirmation signal;
obtaining the cache to be allocated; and
allocating the obtained cache to the disk array.

10. The method according to claim 8, further comprising:
writing the data in the allocated cache into the disk array in response to the garbage collection being finished.

11. A computer system for allocating cache for a disk array, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system further comprises:
an I/O distribution monitor configured to monitor I/O distribution of the disk array in a predetermined time period;
a garbage collection state determiner configured to determine a garbage collection state of the disk array,
wherein the garbage collection state determiner is further configured in a way such that the garbage collection state prevents the disk array to perform the garbage collection in response to the I/O distribution of the disk array being in one of the following states:
the I/O distribution of the disk array is in a busy state and an I/O distribution of a number larger than a first threshold of other disk arrays is also in the busy state;
the I/O distribution of the disk array is in the busy state, the I/O distribution of the number larger than the first threshold of other disk arrays is in a free state, and a number larger than a second threshold of other disk arrays are performing the garbage collection; or
the I/O distribution of the disk array is in a free state and a number larger than a third threshold of other disk arrays are performing the garbage collection; and
a cache allocation controller configured to determine allocation of the cache based on the I/O distribution and the garbage collection state.

12. The computer system according to claim 11, wherein the garbage collection state determiner is further configured to determine the garbage collection state of the disk array based on the I/O distribution of the disk array, an I/O distribution of other disk arrays or a garbage collection state of other disk arrays.

13. The computer system according to claim 11, wherein the garbage collection state determiner is further configured in a way such that the garbage collection state is allowing the disk array to perform the garbage collection in response to the I/O distribution of the disk array being in one of the following states:
the I/O distribution of the disk array is in a busy state, an I/O distribution of a number larger than a first threshold of other disk arrays is in a free state, and a number larger than a second threshold of other disk arrays are not performing the garbage collection; or
the I/O distribution of the disk array is in a free state and a number larger than a third threshold of other disk arrays are not performing the garbage collection.

14. The computer system according to claim 11, wherein the garbage collection state determiner is further configured to determine whether to allow the disk array to perform the garbage collection based on a garbage collection level of the disk array.

15. The computer system according to claim 11, wherein the cache allocation controller is further configured to allocate a largest cache for the disk array in response to the I/O distribution of the disk array being in a busy state and allowing the garbage collection.

16. The computer system according to claim 11, wherein the cache allocation controller is further configured to allocate a smallest cache for the disk array in response to the I/O distribution of the disk array being in a free state and preventing the garbage collection.

17. The computer system according to claim 11, further comprising:
- a garbage collection controller configured to control a garbage collection operation performed in the disk array,
- wherein the cache allocation controller is further configured to receive a garbage collection request signal from garbage collection controller; inquire the garbage collection state; send a confirmation signal to the garbage collection controller, and allocate the cache to be allocated to the disk array, in response to the garbage collection state allowing the disk array to perform the garbage collection.

18. The computer system according to claim 17, wherein the cache allocation controller is further configured to send a delay signal to the garbage collection controller and write data to be cleared from the cache into other disk arrays, in response to the garbage collection state preventing the disk array from performing the garbage collection; send a garbage collection confirmation signal to the garbage collection controller, and allocate the cache to be allocated to the disk array, in response to the writing of the data to be cleared from the cache being finished.

* * * * *